United States Patent
Bourbonnais et al.

(10) Patent No.: US 9,734,223 B2
(45) Date of Patent: Aug. 15, 2017

(54) DIFFERENCE DETERMINATION IN A DATABASE ENVIRONMENT

(71) Applicant: International Business Machines Corporation, Armonk, NY (US)

(72) Inventors: Serge Bourbonnais, Palo Alto, CA (US); Yat O. Lau, San Jose, CA (US); Xiao Li, San Jose, CA (US); Jonathan W. Wierenga, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 644 days.

(21) Appl. No.: 14/026,587

(22) Filed: Sep. 13, 2013

(65) Prior Publication Data

US 2014/0372374 A1 Dec. 18, 2014

Related U.S. Application Data

(60) Provisional application No. 61/835,505, filed on Jun. 14, 2013.

(51) Int. Cl.
*G06F 17/30* (2006.01)
(52) U.S. Cl.
CPC .. *G06F 17/30575* (2013.01); *G06F 17/30578* (2013.01)
(58) Field of Classification Search
USPC ................ 707/613, 614, 615, 616
See application file for complete search history.

(56) References Cited

U.S. PATENT DOCUMENTS

| | | | |
|---|---|---|---|
| 7,734,576 B2 | 6/2010 | Simon et al. | |
| 8,037,056 B2 | 10/2011 | Naicken et al. | |
| 8,301,593 B2 | 10/2012 | Hoffmann et al. | |
| 2006/0190503 A1* | 8/2006 | Naicken | G06F 17/30587 |
| 2009/0313311 A1* | 12/2009 | Hoffmann | G06F 11/2094 |
| 2011/0066593 A1* | 3/2011 | Ahluwalia | G06F 17/30312 707/624 |
| 2011/0264625 A1* | 10/2011 | Samudrala | G06F 17/30557 707/624 |
| 2012/0179841 A1* | 7/2012 | Matesan | G06F 17/30174 709/248 |
| 2014/0114907 A1* | 4/2014 | Kozina | G06F 17/30592 707/602 |

* cited by examiner

*Primary Examiner* — Mohammad S. Rostami
*Assistant Examiner* — Ahmed Abraham
(74) *Attorney, Agent, or Firm* — Patterson + Sheridan, LLP

(57) ABSTRACT

Techniques are disclosed to determine differences between a source table and a target table in a database environment, as being persistent or transient. A first set of differences between the source table and the target table is determined at a first point in time. A second set of differences between the source table and the target table is determined at a second point in time subsequent to the first point in time. At least one of a set of persistent differences and a set of transient differences is determined. The set of persistent differences includes a set intersection of the first and second sets of differences, the set intersection being filtered based on matching non-key values of the differences. The set of transient differences includes a relative complement of the second set of differences in the first set of differences.

13 Claims, 9 Drawing Sheets

DIFFERENCE DETERMINATION IN A DATABASE ENVIRONMENT

BACKGROUND

Field

Embodiments disclosed herein relate to computer databases. More specifically, embodiments disclosed herein relate to difference determination in a database environment.

Description of the Related Art

Databases are computerized information storage and retrieval systems. The most prevalent type of database is the relational database, a tabular database in which data is defined so that it can be reorganized and accessed in a number of different ways.

Regardless of the particular architecture, in a database management system (DBMS), a requesting entity, such as an application, demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that allows programmers and programs to select, insert, and/or update the data.

SUMMARY

Embodiments presented in this disclosure provide a computer-implemented method to programmatically determine differences between a source table and a target table in a database environment, as being persistent or transient, and based on sets of differences from different points in time. The method includes determining a first set of differences between the source table and the target table at a first point in time. The method also includes determining a second set of differences between the source table and the target table at a second point in time subsequent to the first point in time by at least a predefined interval. The method also includes determining at least one of: (i) a set of persistent differences comprising a set intersection of the first and second sets of differences, where the set intersection is filtered based on matching non-key values of differences in the set intersection; and (ii) a set of transient differences comprising a relative complement of the second set of differences in the first set of differences.

Other embodiments presented in this disclosure provide a computer program product to programmatically determine differences between a source table and a target table in a database environment, as being persistent or transient, and based on sets of differences from different points in time. The computer program product includes a computer-readable storage medium having program code embodied therewith, the program code executable to determine a first set of differences between the source table and the target table at a first point in time. The program code is also executable to determine a second set of differences between the source table and the target table at a second point in time subsequent to the first point in time by at least a predefined interval. The program code is also executable to determine at least one of: (i) a set of persistent differences comprising a set intersection of the first and second sets of differences, where the set intersection is filtered based on matching non-key values of differences in the set intersection; and (ii) a set of transient differences comprising a relative complement of the second set of differences in the first set of differences.

Still other embodiments presented in this disclosure provide a system to programmatically determine differences between a source table and a target table in a database environment, as being persistent or transient, and based on sets of differences from different points in time. The system includes one or more computer processors and a memory containing a program which, when executed by the one or more computer processors, is configured to perform an operation that includes determining a first set of differences between the source table and the target table at a first point in time. The operation also includes determining a second set of differences between the source table and the target table at a second point in time subsequent to the first point in time by at least a predefined interval. The operation also includes determining at least one of: (i) a set of persistent differences comprising a set intersection of the first and second sets of differences, where the set intersection is filtered based on matching non-key values of differences in the set intersection; and (ii) a set of transient differences comprising a relative complement of the second set of differences in the first set of differences.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
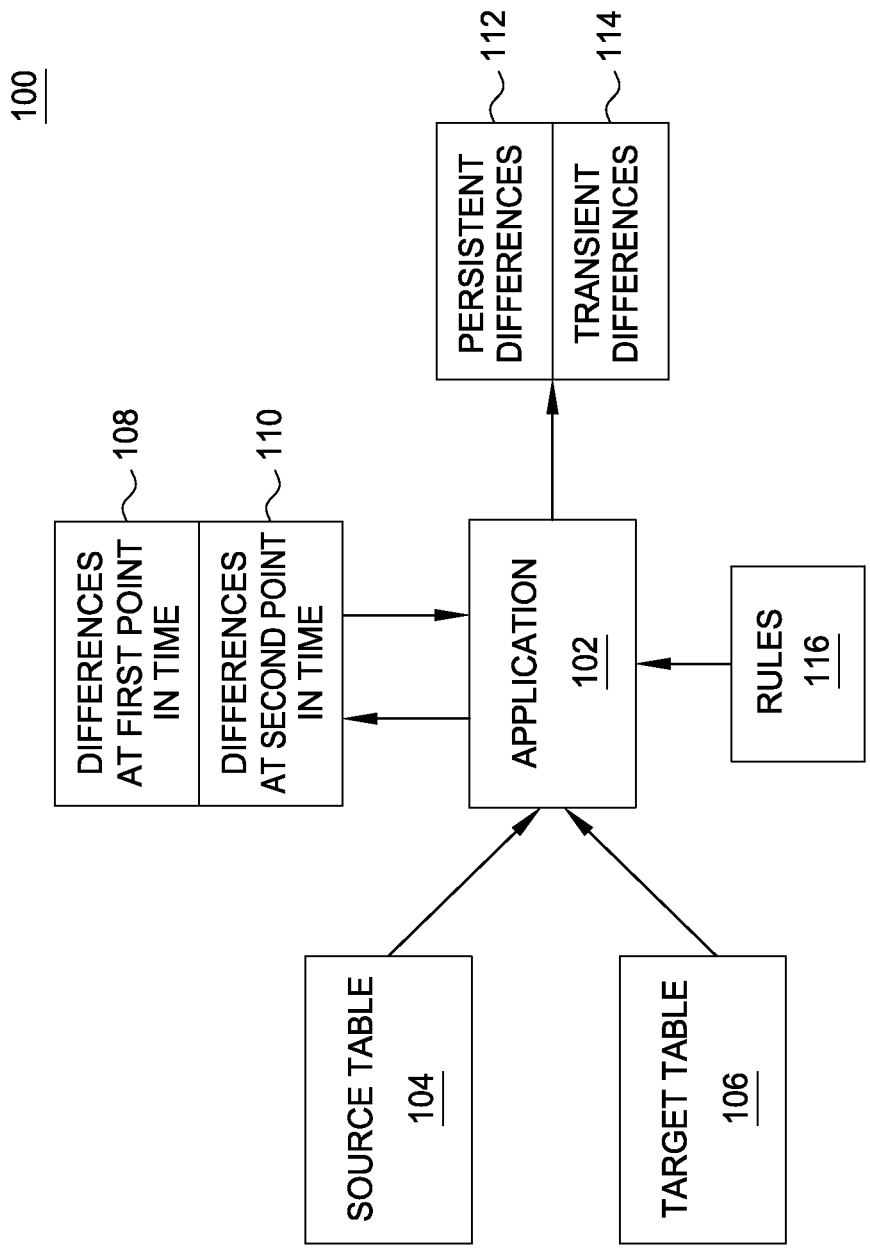
FIG. 1 is a data flow diagram illustrating an application configured to determine differences in a database environment, according to one embodiment presented in this disclosure.

Embodiments presented in this disclosure generally provide techniques to programmatically determine differences between a source table and a target table in a database environment, as being persistent or transient, and based on sets of differences from different points in time. As used herein, a transient difference, also called an in-flight difference, refers to a false-positive difference resulting from a characteristic of the database environment, whereas a persistent difference refers to an actual difference that is not a transient difference. The source and target tables may be stored as part of the same database or stored in respective databases operatively connected via a network. In some embodiments, persistent or transient differences are determined without suspending application access to the source table, without suspending application access to the target table, without changing any schema of the source table, and without changing any schema of the target table.

In one embodiment, the database environment is a replication environment, in which a replication relationship exists between the source and target tables, specifying to replicate data from the source table to the target table. In some embodiments, the replication environment is an active-passive replication environment, in which changes to the source table are synchronized to the target table, but not vice versa—changes that do not result from synchronization may not even be allowed to the target table. In other embodiments, the replication environment is an active-active replication environment, in which changes to any of the source table and the target table are synchronized to the other table. Synchronization between the source and target tables in an active-active replication environment may be maintained by an asynchronous replication process. In environments such as an active-active replication where changes can occur at each table, data integrity may be compromised due to factors such as a faulty replication process, conflict resolution errors, data corruptions, operator errors, and so on. The techniques disclosed herein may be used to verify that data in the source and target tables are consistent as of a given point in time and without requiring suspending changes to either table. To that end, the techniques disclosed herein provide an application configured to verify data consistency between source and target tables for which synchronization is maintained via a replication process. In a particular embodiment, the application is a table comparison utility.

In some embodiments, when comparing source and target tables whilst changes are being applied against the tables, some differences may result from replication latency—e.g., changes at the source table that have not yet been made at the target table, due to the asynchronous nature of the replication process. These differences will no longer be present once the changes are applied to the target table. To determine only those differences that are not caused by the asynchronous replication latency, the application may perform two separate comparisons that are spaced apart in time by at least one replication latency interval, and then take the union of the differences resulting from the two separate comparisons. In the context of an active-active replication environment, a transient difference refers to a false-positive difference resulting from an asynchronous property of the replication environment—such as changes at the source table that have yet to be propagated to the target table as a result of the asynchronous property of the replication environment. In some cases, row keys may be used to identify each unique row across comparisons, such that if a row key appears in the respective results from both comparisons, it can be assumed that the row identified by the row key is a persistent difference. However, performing two comparisons may be an inefficient approach that can generate an incorrect result at least in some cases—such as when a non-key value is updated against the same row, in which case even if the key values appear twice, it is still indeterminate whether the change is persistent.

In one embodiment, to facilitate determining persistent differences, the application is configured such as not to impact any applications that are currently accessing the source or target tables. For instance, in some embodiments, there is no logical impact to the data being returned to the applications, and any performance impact to the applications is kept at or below a threshold impact level. Further, the applications need not be suspended as a precondition to correctly determining persistent differences. To extract data from the databases, most or all of the read operations may have an associated isolation level of an uncommitted read, which does not place any lock on a fetched row. As a result, some transient differences may also result from transaction rollbacks.

Further still, the application does not require any schema change to the source or target tables. The application also does not require any row-change-timestamp column to be present in the source and target tables, which value is updated every time the corresponding row is updated. However, the application may require a unique key with which to identify each row within the source and target tables. The application may also require data types in the source and target tables to be comparable data types—e.g., data types for which an appropriate comparison operator is defined. Using the techniques disclosed herein, the application is configured to efficiently determine persistent differences even in scenarios where the source and target tables each occupy beyond a threshold size in terms of storage and are separated by a wide-area network (WAN). In this regard, the tables may be separated by beyond a threshold network distance. The application is also configured to efficiently determine persistent differences even when the ratio of persistent to transient differences is low, such as often is the case when changes to both the source and target tables are permitted.

FIG. 1 is a data flow diagram illustrating an application 102 configured to determine differences in a database environment, according to one embodiment presented in this disclosure. As shown, the application 102 performs comparisons of a source table 104 and a target table 106 at different points in time, which may be separated by at least a predefined interval such as a replication latency interval. Based on the comparisons, the application 102 determines differences 108 at a first point in time and differences 110 at a second point in time subsequent to the first point in time. Based on the differences 108, 110, the application 102 determines persistent differences 112 and/or transient differences 114 according to a set of predefined rules 116. The application 102 then outputs an indication of at least one persistent or transient difference. In some embodiments, the application 102 determines a set of tentative differences by filtering the differences 110 at the second point in time based on non-matching non-key values of the differences, and at least one difference in the set of tentative differences is subsequently determined to be a persistent difference or a transient difference. In some embodiments, several difference determinations between the source and target tables are used to distinguish between persistent differences and transient differences of the source and target tables. For instance, in one embodiment, at least one difference is determined to be a persistent difference or a transient difference based on the differences 110 at the second point in time and based further on differences at a third point in time subsequent to the second point in time.

In some embodiments, the techniques disclosed herein may be implemented by extending an architecture for a table comparison utility that prohibits updates from being made to the source or target tables during comparisons and that is not configured to tell persistent and transient differences apart but that is nevertheless configured to efficiently compare tables separated by a WAN and regardless of table size. The table comparison utility, also referred to as a comparison utility, is a parallel utility that compares tables in three sequential stages including a preprocessing stage, a differencing stage, and a cleanup stage. In the pre-processing stage, the parallel utility verifies that a set of preconditions is met and then computes a count of parallel threads to use for comparison and a count of partitions into which to divide the source and target tables. The parallel utility then creates non-logged, global temporary tables at the respective databases storing the source and target tables. The global temporary tables store temporary records of row-based key values and checksums, which are subsequently used for a row-by-row comparison when partition-based checksums do not match. One type of checksum is a cyclic redundancy check (CRC).

Figure 2:
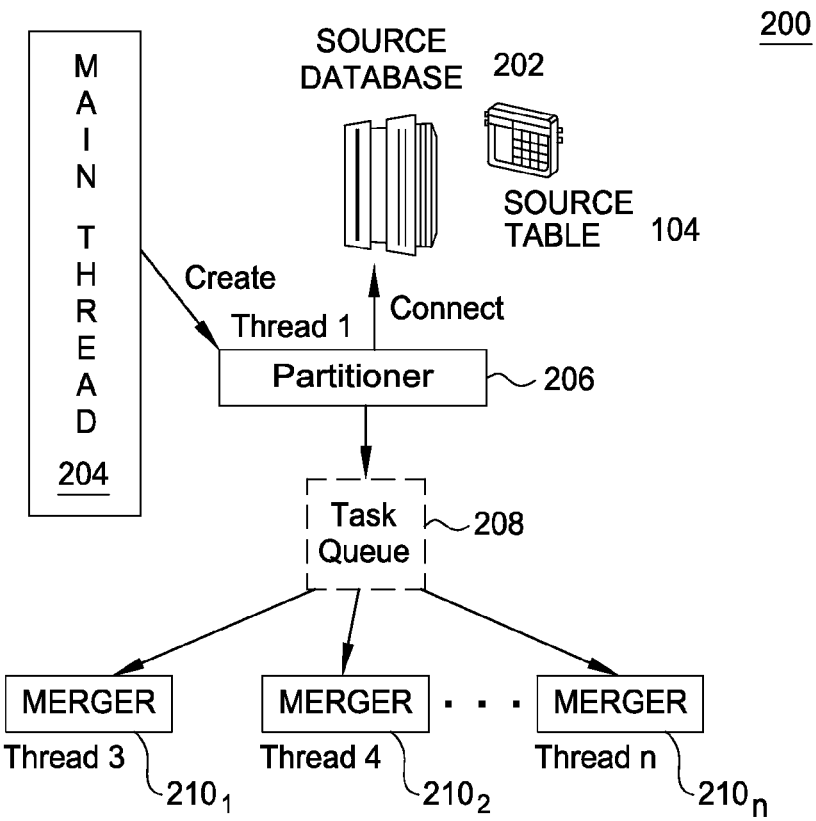
FIG. 2 is a diagram illustrating an application architecture for a table comparison utility, according to one embodiment presented in this disclosure.

FIG. 2 is a diagram illustrating an architecture 200 for the comparison utility, according to one embodiment presented in this disclosure. The comparison utility in the differencing stage includes a pool of cooperative threads including a main thread 204, a partitioner thread 206, merger threads $210_{1-n}$ and worker threads, which are discussed below in conjunction with FIG. 3. In the differencing stage, the main thread 204 creates a partitioner thread 206, which splits the table comparison operation based on key values and into smaller but similarly-sized sub-operations or tasks, each of which corresponds to a subset or partition of the source and target tables. In this regard, the partitioner thread 206 selects the boundary key values for each partition from the source table 104, including minimum boundary key values and maximum boundary key values, where the source table 104 is stored in a source database 202. In one embodiment, the partition boundaries are determined as a function of the number of blocks of the source table 104 and the total number of rows in the source table 104. The partitioner thread 206 uses the boundary key values to generate query statements to fetch specific partitions from the source and the target tables. The partitioner thread 206 then communicates the query statements to the merger threads 210 via a task queue 208.

Figure 3:
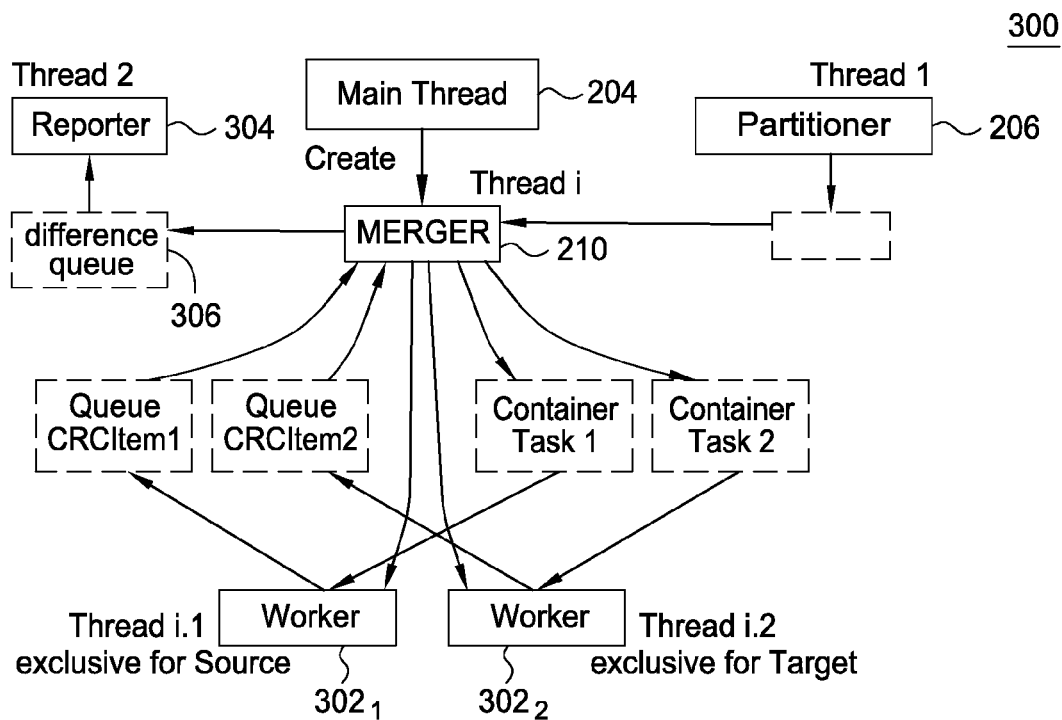
FIG. 3 is a diagram illustrating the application architecture for the table comparison utility, according to one embodiment presented in this disclosure.

FIG. 3 is a diagram illustrating the architecture 300 for the comparison utility, according to one embodiment presented in this disclosure. As stated above, the partitioner thread 206 distributes the query statements and associated partition comparison tasks to the merger threads 210 through the task queue during runtime and based on a predefined workload balancing policy. The merger threads 210 identify differences from the respective partition comparison tasks. To that end, each merger thread 210 creates two worker threads $302_{1-2}$, including a worker thread that interacts with the source database exclusively and a worker thread that interacts with the target database exclusively. For each partition, the merger thread 210 assigns the corresponding query statement that describes the respective partition, to each of the worker threads 302 via a task container. The worker threads 302 then call a stored procedure on each of the source and target databases.

In one embodiment, the stored procedure is predefined and configured to return an aggregated checksum over the partition identified by the query statement. The aggregated checksum is also referred to herein as a composite checksum. The stored procedure receives the query statement as an input parameter and performs multi-row fetches against the database to extract all rows within the identified partition. The stored procedure computes a respective row checksum for each row. The key values and checksums are inserted into a non-logged, global temporary table instance associated with the calling worker thread 302. Further, the stored procedure calls a partition checksum function is to aggregate all the row-based checksums within the identified partition to a single checksum value. In some embodiments, the partition checksum is of a greater length than the row checksum. For example, in a particular embodiment, each row checksum is four bytes in length, while each partition checksum is eight bytes in length.

In one embodiment, if the two partition checksums match, the merger thread 210 regards the current partition as being consistent across the source and target tables and requests a next partition from the task queue. Otherwise, the merger thread 210 competes with the other merger threads for a permit for fetching from the global temporary table. After earning the permit, the merger thread 210 sends a merge request to the worker threads 302 to initiate a merge-compare sub-stage. During the merge-compare sub-stage, the two worker threads 302 working on the partition fetch the key and corresponding row-based checksum from the global temporary tables, sorted by key order, and pass them to the merger thread 210 via a checksum item queue. The merger thread 210 then performs a merge join on the key values to discover differences on a row-by-row basis, reporting any identified difference to a difference reporter thread 304 via a difference queue 306.

In one embodiment, the difference reporter thread 304, also referred to herein as a reporter thread, is configured to read discovered differences from the difference queue 306 and insert a difference entry into a differencing table, the difference entry containing a key value identifying a difference and a corresponding action, such as an insert, update, or delete, to correct the difference. In the cleanup stage, the comparison utility drops the definition of the global temporary tables from the database catalogs and outputs a summary of the identified differences and completion statistics of each thread.

As described above, the techniques disclosed herein may be implemented by extending the architecture for the table comparison utility. The extended architecture may serve as a basis for the application. Such an application is also referred to herein as an in-flight comparison utility. The extended architecture may be even more suitable than the original architecture in terms of difference determination in particular environments, such as active/active replication environments. The extended architecture is designed to take advantage of a set of characteristics of the database environment.

In one embodiment, the set of characteristics include a commonality characteristic, a uniqueness characteristic, and a regularity characteristic. The commonality characteristic specifies common codepages and hardware architecture shared by the database management systems (DBMSs) of the source and target databases. For instance, the DBMSs share the same endian-ness and collation sequences. The uniqueness characteristic specifies that tables have a unique property, such as a unique key, for a subset of common columns. At least in some embodiments, the unique property is required to be the same on the source and target tables—in such cases, any unique identifier based on relative byte address of a row, e.g., a ROWID, is not a suitable candidate. The regularity characteristic specifies that the table comparison utility is executed regularly. In some embodiments, when the regularity characteristic is not met, a subsequent table comparison is required after at least a replication interval has elapsed since the previous table comparison.

In one embodiment, the application generates or populates a difference table for each pair of source and target tables. Each record in the difference table is a difference entry and represents a row-specific difference between the source and target tables, where each row is identifiable by its key values. Each difference entry contains a set of key values, a difference flag, and a persistence flag. The set of key values refers to a set of attribute values that are the key values in both the source and target tables. Using the key values, corresponding rows in the source and target tables can be fetched. The difference flag specifies how a key-specific row is different between the source and target tables. The difference flag is selected from at least three difference flag types including update, insert, and delete—e.g., whether an update, insert, or delete operation would be required to correct the difference. The persistence flag is specifies whether the difference entry represents a persistent entry or a transient entry and is selected from at least three persistence flag types including persistent, non-persistent (transient), and unknown, also referred to herein as tentative.

In one embodiment, each comparison between two rows uses the result of the last comparison between the two rows in order to determine the persistence of any difference between the two rows. If updates are suspected to occur against the tables that are maintained by replication, the current comparison operation should be performed after the replication latency window has elapsed since the last comparison operation. Comparison results may be classified into three cases as follows. First, if the difference exists in both sets of results and the non-key values are still the same, the difference is deemed to be persistent. Second, if the difference does not exist in the current comparison result, the difference is deemed to be transient. The difference may be in-flight, rolled-back or repaired, depending on the embodiment. To free up storage space, these differences may be removed after the second compare. Third, if the difference exists in the current compare result or in both results, but their non-key values are different, then the difference is deemed to be of an known type and may be further determined in a subsequent comparison operation.

In one embodiment, the application, when configured according to the techniques herein, exhibits a set of properties including persistence identification, higher parallelism, lower overhead, and improved usability. As described above, the inflight comparison utility determines the persistence of differences by using previously identified differences reflected in the differences table. In some embodiments, to more efficiently capture difference changes on non-key values, the application adds or populates a new column in the difference table, where the new column stores a column compare-based checksum, such as a column compare-based CRC (CCRC). In one embodiment, each CCRC value aggregates two row-based checksums from the source table and the target table, respectively. Accordingly, the column compare-based checksum may also be referred to as an aggregate checksum or composite checksum. To the extent that the CCRC exhibits uniqueness properties beyond those of a row checksum, the procedure of comparing two consecutive difference results may be simplified when comparing their CCRC values. In some embodiments, the application may also be configured with a predefined handler for checksum collisions on CCRC values.

As stated above, in one embodiment, the application may also exhibit the property of higher parallelism. Because the number of reported differences at any given time could be much higher than the number of persistent differences in a pair of tables, the processing and reporting of differences may be made more efficient by configuring the application to support block-based difference reporting between different threads, rather than row-based difference reporting. Further, rotating memory blocks may be used to reduce the waiting time of the other coordinating threads. Multi-row inserts may also be applied to improve performance of inserting differences into the difference table. Further, the initial checksum and key fetching from the difference table may occur in parallel with the other threads for table comparison.

As stated above, in one embodiment, the application may also exhibit the property of lower overhead. To reduce computation costs, the application uses a two-level searching tree for checksum comparison based on the memory blocks, which are configured for multi-row based checksum fetching. To reduce network traffic, the application fetches key values from the difference table over the network only for persistent differences. To avoid individual deletion, the application adds or maintains a row-insert-timestamp column into the difference table, which value is the timestamp when the row is inserted. Based on this column, the application may delete identified inflight differences using a single delete command. To reduce impact on applications currently accessing the source and target tables, the application uses committed read on source and target databases only for fetching differences that are either persistent or caused by uncommitted reads.

As stated above, in one embodiment, the application may also exhibit the property of improved usability. The application may be configured based on user input to further limit the number of committed reads performed by the application, to further reduce the impact on the applications currently accessing the source and target tables. As stated above, the application is configured to generate partitioning queries such that the partitioning queries may be reused in subsequent table comparisons. Users of the application may also identify a subset of the tables merely by specifying a range of the blocks to compare. Accordingly, the application may be executed to evaluate only rows within the block or range, for which differences were reported in a previous run.

Figure 4:
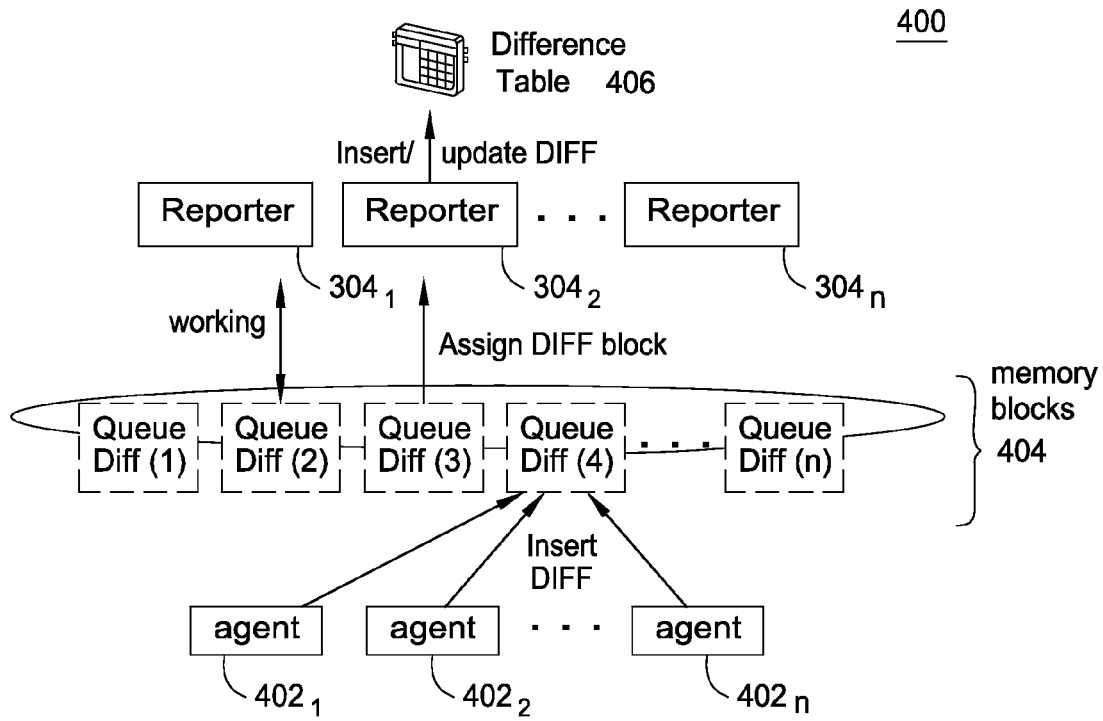
FIG. 4 is a diagram illustrating an application architecture for an inflight comparison utility, according to one embodiment presented in this disclosure.

FIG. 4 is a diagram illustrating an architecture 400 for the inflight comparison utility, according to one embodiment presented in this disclosure. In one embodiment, the merger threads can be regarded as agents $402_{1-n}$ configured to determine differences between the source and target tables. Similarly, the difference reporter thread may be regarded as a difference reporter agent, and likewise with other thread types disclosed herein. The determined differences are inserted as difference entries into a difference queue, whereafter the difference reporter thread processes the difference entries and records results in a difference table accordingly. In some embodiments, the comparison utility operates under an assumption that the source and target table have fewer than a threshold amount of differences, e.g., less than 0.01% differences. However, such an assumption may not hold true in an active/active environment, where the transient differences could be great in number. Accordingly, the architecture may be extended in one or more of the following ways. For example, rather than having a difference queue occupying only a single memory block, a difference queue is provided that has at least two rotating memory blocks 404, also referred to herein as queue diffs. When a difference reporter thread 304 is reading and processing the contents of a block, the merger threads should not make the content changes on the block until the difference reporter thread completes the processing of the entire block.

As another example, rather than having differences immediately reported to the difference reporter thread and then inserted individually, the differences are batched based on a predefined grouping policy for thread coordination and difference insertion. In one embodiment, the merger threads notify the difference reporter thread that a given memory block for array insertion is ready for processing, upon determining that one of the following conditions is true: (i) one of the memory blocks 404 in the difference queue is full; (ii) one of the memory blocks 404 contains a specific number of differences within a particular time interval, e.g., the time interval corresponding to when the difference was identified; and (iii) the whole compare is completed. In one embodiment, each block can be directly used in a corresponding descriptor area that can be used in a multi-row insert by the difference reporting thread. A descriptor area refers to a collection of variables required for dynamic execution of an insert statement. One example of a descriptor area is a SQL descriptor area (SQLDA), which is a collection of variables required for execution of a SQL INSERT statement. Each variable describes a host variable array that represents a buffer that contains one or more values for a column of target table.

As a further example, rather than maintaining only the key values and associated actions as part of each difference entry in the difference table, the difference entries are augmented to include one or more of the following attributes for each: persistence type, compare-based checksum, and creation timestamp. In one embodiment, persistence types are determined by the difference reporter threads, while row-based checksums are determined by the merger threads.

In one embodiment, to improve comparison performance and to determine the persistence type for a reported difference, a CCRC to represent the compare result of a specific row. Given that each row in either the source or target table can be identified by its key values, the key values are combined to generate a row-specific checksum value. Each CCRC is aggregated from two corresponding row-specific checksum values. The CCRCs may simplify comparison at least in some cases, e.g., in that only the CCRCs of the same key value from two different invocations of the inflight comparison utility are to be compared. If the checksums match, the difference is deemed persistent; otherwise, the difference is deemed transient.

In one embodiment, the application aggregates two row-based checksums into the CCRC using any of a variety of predefined techniques. For instance, a bitwise exclusive-or (XOR) may be used as an aggregation function. In order to calculate a CCRC, the source and target row-specific checksums should not match. If the checksums are identical, that means that the rows are not different from one another. Further, to the extent that the row-specific checksum values are uniformly distributed, the XOR-generated checksum values should be similarly distributed. Further still, though two distinct differences may have a CCRC collision, the application is configured to support handling of the collision using a predefined collision array and as further discussed below.

In one embodiment, persistence type is determined by three stages and according to a set of predefined rules. The three stages include initialization, persistent difference identification, and difference table cleanup. Two different approaches to determining persistence type are disclosed. The first approach incurs lower costs in terms of network traffic and memory but involves a greater number of database operations, at least relative to the second approach. The first approach may provide superior performance in scenarios where the network speed is low and the storage size for transient differences is large, and vice versa. The network speed is deemed as being low if the network bandwidth is low and/or the network latency is high.

Figure 5:
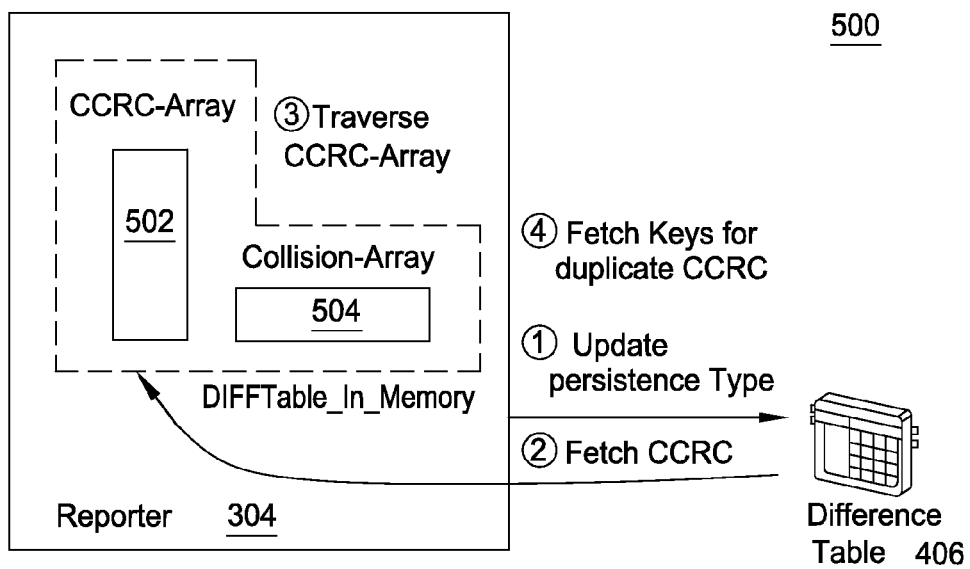
FIG. 5 is a diagram illustrating an initialization operation under a first approach for identifying persistent differences, according to one embodiment presented in this disclosure.

FIG. 5 is a diagram 500 illustrating an initialization operation under the first approach, according to one embodiment presented in this disclosure. In the first approach, rather than having the difference reporter thread 304 sleep until the first identified difference is inserted to the difference queue, the difference reporter thread 304 instead is configured to, prior to processing the identified differences, initialize the difference table 406 and populate two local arrays, including a CCRC array 502 and a collision array 504. This initialization occurs in parallel with other threads involved in the table comparison. The difference table 406 is initialized by updating values of the persistence-type column to "unknown". The arrays are populated by fetching the CCRC values from the difference tables, where the values are ordered by the CCRC column, and storing the ordered CCRC values into the CCRC array 502. The difference reporter thread then traverses the CCRC array 502 to find duplicates. Different rows share the same CCRC values in the event that a collision occurs. For such duplicates, the difference reporter thread fetches the corresponding key values from the difference table 406 and stores them with the CCRC values in the collision array 504.

In the persistent difference identification stage of the first approach, rather than having the difference reporter thread insert the identified difference into difference table immediately after the merge thread identifies the difference, the identified differences are instead processed in batch mode and according to a predefined grouping policy. At least in some embodiments, difference identification by merger threads and difference processing by reporter threads are fully parallelized. The difference reporter thread begins processing the differences once the merger thread indicates that a given memory block is ready for processing. In one embodiment, each memory block contains an insert array having the same structure as the difference table. Depending on the embodiment, the structure is the same in terms of one or more of the key values, the corresponding actions or difference type, the persistence type, the CCRC, and the creation timestamp. The key values, the corresponding actions, CCRC values, and the creation timestamps are determined by the merger threads, while the persistence type values are initialized to "unknown".

Figure 6:
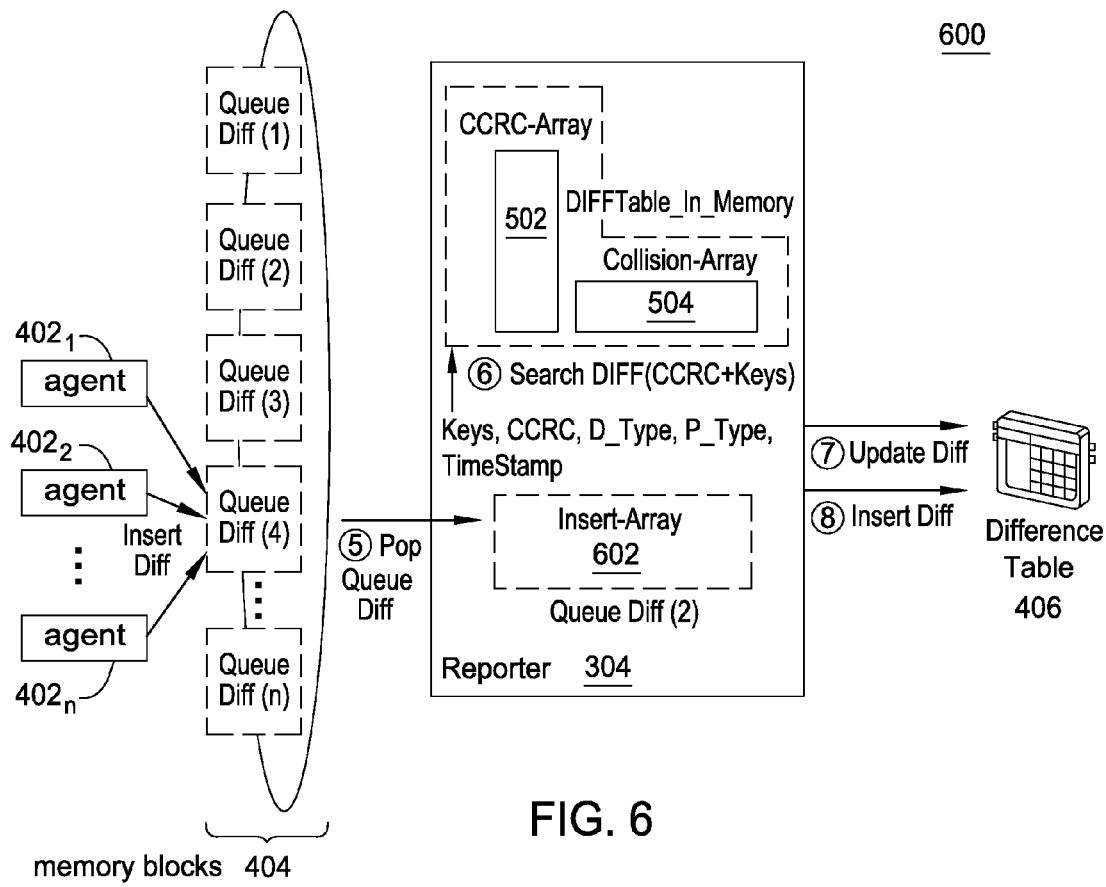
FIG. 6 is a diagram illustrating an operation under the first approach, to process an insert array of a memory block, according to one embodiment presented in this disclosure.

FIG. 6 is a diagram 600 illustrating an operation under the first approach, to process an insert array 602 of a memory block 404, upon the merger threads notifying the reporter thread 304 that the memory block 404 is ready for processing, according to one embodiment presented in this disclosure. In one embodiment, for each difference in the difference queue, the reporter thread 304 performs a binary search against the CCRC array 502 and the collision array 504 to determine if the difference exists in the current difference table 406. If the difference exists, the reporter thread 304 updates the persistence type to "persistent"; otherwise, the persistence type is updated to "transient". Then, the reporter thread 304 modifies the difference table 406 by using an update operation to set the persistence type from "unknown" to "persistent" with the corresponding key values in the WHERE condition of the update operation. When the difference table 406 does not have the same key values, the update fails, which means that a checksum collision has occurred. In that scenario, the persistence type is updated from "persistent" to "transient". The reporter thread 304 then performs insert operations—such as multi-row insert—for the remaining differences, which persistence types are "transient".

Figure 7:
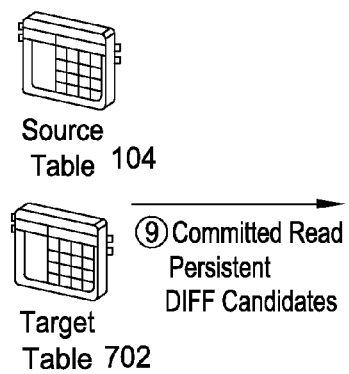
FIG. 7 is a diagram illustrating an operation under the first approach, to remove differences resulting from long running, uncommitted transactions, according to one embodiment presented in this disclosure.
Figure 7:
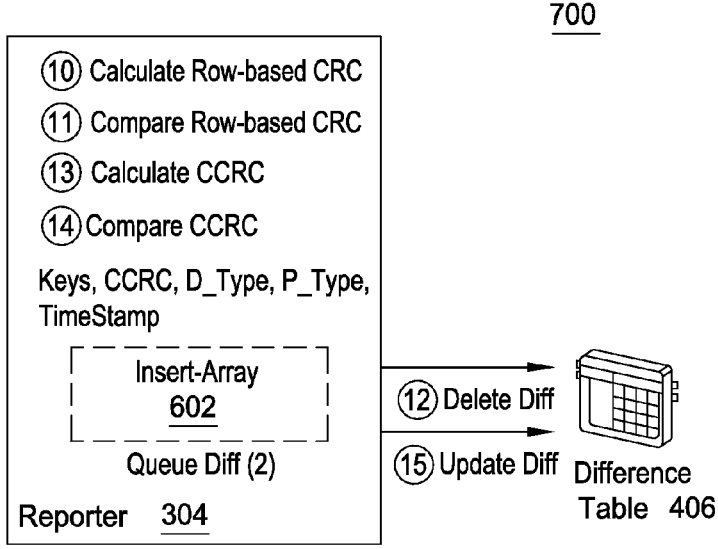

FIG. 7 is a diagram 700 illustrating an operation under the first approach, to remove differences resulting from long running, uncommitted transactions, according to one embodiment presented in this disclosure. In some embodiments, after processing the insert array 602 of the memory block, the reporter thread 304 optionally removes such differences that result from long running, uncommitted transactions. In scenarios where all the read operations by the application are uncommitted reads, the difference table may contain differences that are caused by such long running, uncommitted transactions. The number of committed reads may be limited based on user input in some cases. When committed reads are permitted, the reporter thread 304 processes a set of persistent difference candidates to determine if any of the candidates are false positives. To that end, for each difference in the insert array having a persistence type of "persistent", the reporter thread 304 uses a committed read to fetch the entire corresponding row from both the source and target tables 104, 702. The reporter thread 304 then determines row-based checksums to determine if the rows with the same key values are still different. If the checksums are the same, the reporter thread 304 deletes the difference from both the insert array 602 and the difference table 406. Otherwise, the reporter thread 304 determines the CCRC value for comparison with the corresponding CCRC value in the insert array 602. If the CCRC values are not identical, the reporter thread 304 updates the difference table 406 by setting the persistence type from "persistent" to "transient"; otherwise, the persistence type remains "persistent".

Figure 8:
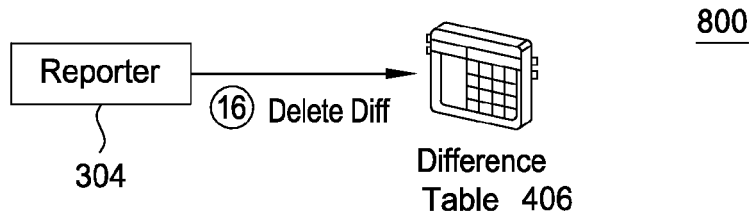
FIG. 8 is a diagram illustrating a cleanup operation for a difference table under the first approach, according to one embodiment presented in this disclosure.

FIG. 8 is a diagram 800 illustrating a cleanup operation for the difference table 406 under the first approach, according to one embodiment presented in this disclosure. After optionally removing differences resulting from long running, uncommitted transactions, if the entire table comparison is not yet complete, the reporter thread 304 returns to process an insert array of a next memory block ready for processing. On the other hand, if the entire table comparison is complete, the reporter thread 304 deletes, from the difference table 406, difference entries which persistence type is still "unknown". Because the persistence type of these entries was not updated, the differences should not appear in the current table comparison results. Such differences could be in-flight, rolled-back, or repaired.

Figure 9:
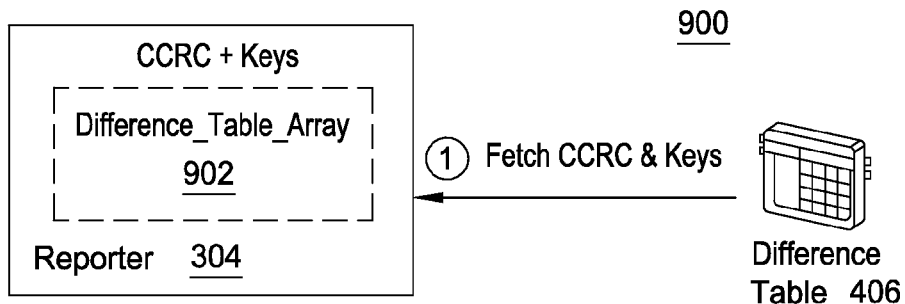
FIG. 9 is a diagram illustrating an initialization operation under the second approach for identifying persistent differences, according to one embodiment presented in this disclosure.

FIG. 9 is a diagram 900 illustrating an initialization operation under the second approach, according to one embodiment presented in this disclosure. Under the second approach, the initialization operation executes in parallel with other threads for table comparison. Before the reporter thread 304 begins processing the identified differences, the reporter thread 304 first fetches the CCRC and key values from difference table 406, where the fetched values are sorted by CCRC, and stores the fetched values in a difference table array 902. In one embodiment, although different rows may potentially share the same CCRC values when collisions occur, their key values would still be unique. Further, spill files may be created when the available memory space is not large enough to accommodate all of the key values and CCRC values.

In the persistent difference identification stage of the second approach, rather than having the reporter thread insert the identified difference into difference table immediately after the merge thread identifies the difference, the identified differences are instead also processed in batch mode and according to a predefined grouping policy. To that end, the reporter thread begins processing the differences upon the merger thread indicating that a memory block is ready for processing. Each memory block contains an insert array that has the same structure as the difference table. In a particular embodiment, the reporter thread determines the values for persistence type, while values for other columns are set by merger threads. Values for persistence type are initially set to "unknown".

Figure 10:
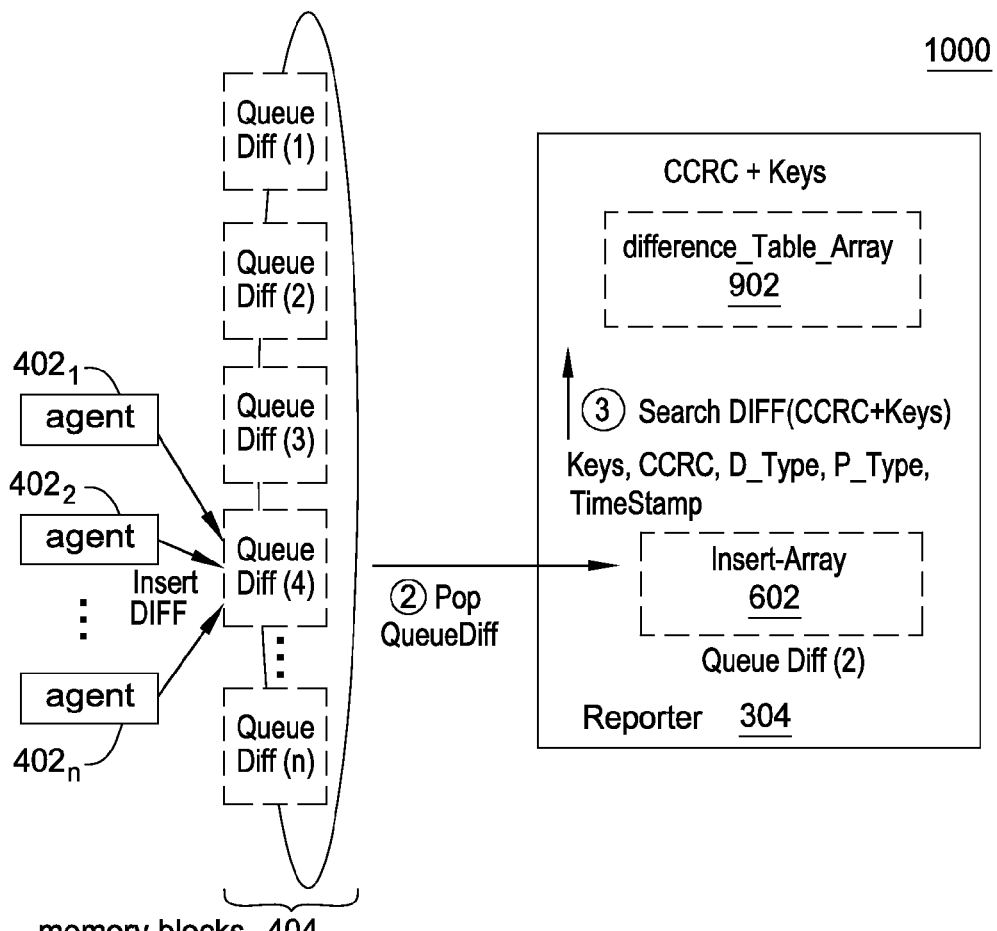
FIG. 10 is a diagram illustrating an operation under the second approach, to process an insert array of a memory block, according to one embodiment presented in this disclosure.

FIG. 10 is a diagram 1000 illustrating an operation under the second approach, to process an insert array 602 of a memory block 404, upon the merger threads notifying the reporter thread 304 that the memory block 404 is ready for processing, according to one embodiment presented in this disclosure. In one embodiment, for each difference in the difference queue, the reporter thread 304 performs a binary search on the CCRC values of the difference table array 902 to determine if the CCRC exists in the current difference table. If the CCRC does not exist, the reporter thread 304 updates the persistence type to "transient". Otherwise, additional comparisons are conducted on key values. If the additional comparisons result in a match, the reporter thread 304 updates the persistence type to "persistent"; otherwise, the persistence type is updated to "transient".

Figure 11:
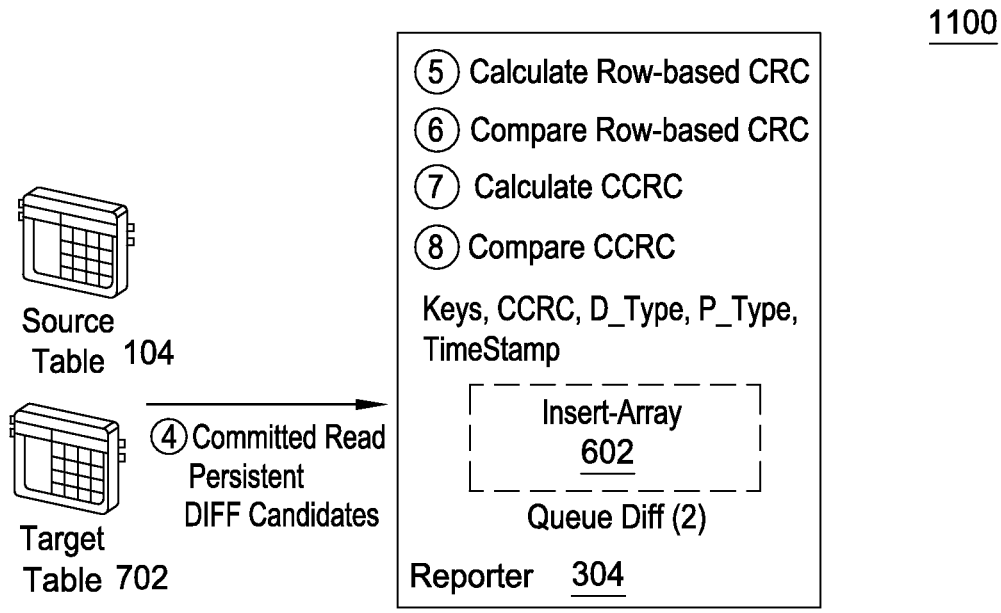
FIG. 11 is a diagram illustrating an operation under the second approach, to remove differences resulting from long running, uncommitted transactions, according to one embodiment presented in this disclosure.

FIG. 11 is a diagram 1100 illustrating an operation under the second approach, to remove differences resulting from long running, uncommitted transactions, according to one embodiment presented in this disclosure. In some embodiments, after processing the insert array 602 of the memory block, the reporter thread 304 optionally removes such differences that result from long running, uncommitted transactions. To that end, the reporter thread fetches the source and target tables 104, 702. To improve concurrency while maintaining data consistency, in some embodiments, the source and target tables 104, 702 may be fetched via a cursor stability isolation level, which allows a shared lock to be placed on a fetched row, such that the shared lock is released when another row is fetched or the cursor is closed. Another process is permitted to place a shared lock on the same row, but no process is permitted to acquire an exclusive lock to modify data in the row.

In one embodiment, the reporter thread 304 only fetches the rows which persistence type is "persistent" in the insert array 602. These differences exclude non-persistent rows caused by replication delay, which reduces the number of potential difference candidates. For the fetched rows, the reporter thread 304 determines row-based checksums to determine if rows with matching key values are still different. If the checksums are the same, the reporter thread 304 deletes the difference from the insert array 902. Otherwise, the reporter thread 304 determines the CCRC value for comparison with the corresponding CCRC value in the insert array 602. If the CCRC values are not identical, the reporter thread 304 updates the insert array 602 by setting the persistence type from "persistent" to "transient"; otherwise, the persistence type remains "persistent".

Figure 12:
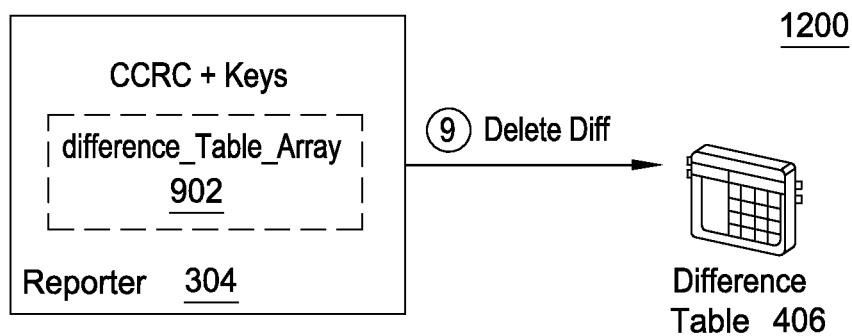
FIG. 12 is a diagram illustrating an insertion operation for the difference table under the second approach, according to one embodiment presented in this disclosure.

FIG. 12 is a diagram 1200 illustrating an insertion operation for the difference table 406 under the second approach, according to one embodiment presented in this disclosure. After optionally removing differences resulting from long running, uncommitted transactions, the reporter thread 304 inserts differences into the difference table 406. In a particular embodiment, the entire insert array is inserted into the difference table 406. Depending on the embodiment, multi-row insert may be used for the insertion operation.

Figure 13:
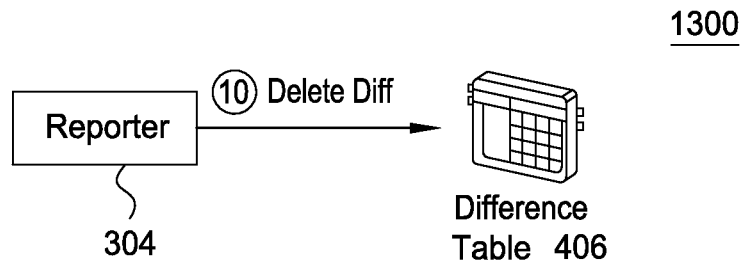
FIG. 13 is a diagram illustrating a cleanup operation for the difference table under the second approach, according to one embodiment presented in this disclosure.

FIG. 13 is a diagram 1300 illustrating a cleanup operation for the difference table 406 under the second approach, according to one embodiment presented in this disclosure. After inserting differences into the difference table 406, if the entire table comparison is not yet complete, the reporter thread 304 returns to process an insert array of a next memory block ready for processing. On the other hand, if the entire table comparison is complete, the reporter thread 304 deletes, from the difference table 406, difference entries which creation timestamp is prior to an execution time associated with the current comparison operation, because such difference entries are deemed obsolete. Depending on the embodiment, the execution time may be an execution start time, an execution end time, or any point in time during execution. If the comparison operation failed, the reporter thread 304 deletes, from the difference table 406, all difference entries which creation time is subsequent to the execution time.

Figure 14:
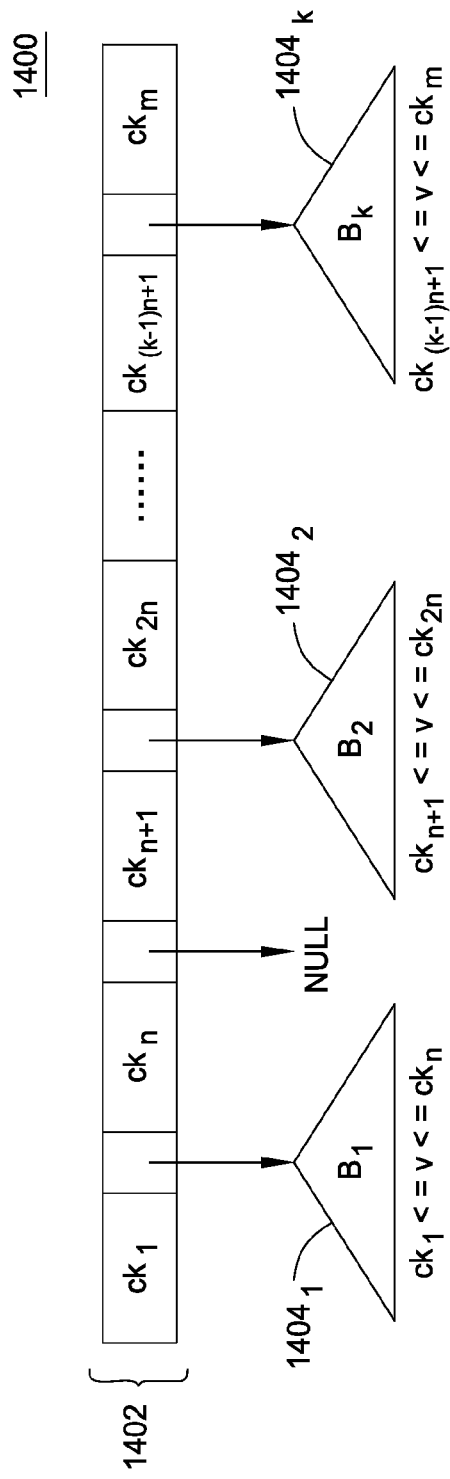
FIG. 14 illustrates a data structure to facilitate checksum searching, according to one embodiment presented in this disclosure.

FIG. 14 illustrates a data structure 1400 to facilitate checksum searching, according to one embodiment presented in this disclosure. Checksum searching is performed to determine if a difference exists in a previous difference table, e.g., a difference table storing entries specific to a previous execution of the table comparison. To improve performance, multi-row fetch queries may be used to retrieve the checksum values from the difference tables, where the checksum values are sorted. Based on the sorted checksum values, the data structure 1400 may be constructed. In a particular embodiment, the data structure 1400 is a two-level search tree including a first level 1402 and a second level $1404_{1-k}$; however, other embodiments are broadly contemplated.

In the data structure 1400, the total number of rows in the difference table is given by m, and each multi-row fetch retrieves n checksum values, which are stored in a corresponding memory block. $B_i$ represents the memory block for the i-th fetch, and $B_k$ represents the last fetch. In one embodiment, the allocated memory blocks may be regarded as the basic checksum storage and search units. The first level 1402 of the data structure 1400 stores pointers to memory blocks Bi of the second level $1404_{1-k}$, and the first and last checksum values, e.g., $ck_{(i-1)n+1}$, $ck_{in}$. Accordingly, checksum searching includes block finding and value searching. Block finding identifies blocks based on desired criteria and uses the binary searching algorithm on the first and last checksum values of all the blocks, e.g., the first-level checksum array $ck_1$, $ck_n$, $ck_{n+1}$, $ck_{2n}$, . . . , $ck_{(k-1)n+1}$, $ck_m$. If no suitable block is found, then the checksum value does not exist in the difference table. On the other hand, if a suitable block is found, the entire block is then searched for the desired checksum values. Binary searching may also be used in searching for the desired checksum value in a particular memory block.

At least in some embodiments, in the original architecture, the sorted key values are fetched from the source table, and based on the pre-determined number of partitions, boundary key values are determined for each partition from the source table. Then, the boundary key values are used to generate query statements to fetch specific partitions from the source and the target tables. The generated queries are not exposed to the users. In one embodiment, to allow users to specify desired table subsets without requiring the users to add their own predicates to the queries, the extended architecture supports outputting the partitioning queries with the corresponding partition number. The output queries can be used as the partitioning queries on subsequent runs. On a subsequent run, users can specify a desired table subset merely by specifying a range of blocks to compare, e.g., block range=1, 2, 100-200, 999.

Accordingly, it is possible to restrict a re-run of the table comparison to only the block or partition range for which differences were reported on previous runs. In some embodiments, restricting re-runs of table comparisons also allows performance issues to be analyzed, such as troubleshooting slow performance of the table comparison over a particular block or partition range. Further, in the original architecture, the boundary key values are selected from the minimum and maximum values for each partition. To support reuse of partitioning queries, the extended architecture in some embodiments removes a potential gap resulting from partitioning queries from two sequential blocks. To that end, the minimum value is chosen as the boundary of two sequential blocks in one embodiment. Additionally or alternatively, the maximum value is chosen as the boundary of two sequential blocks.

Figure 15:
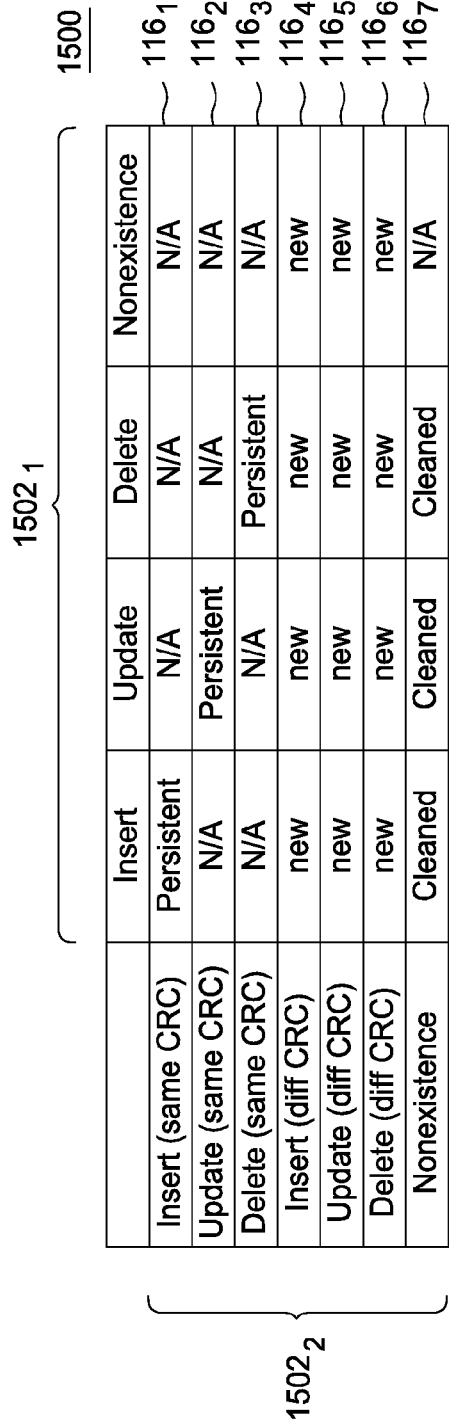
FIG. 15 is a table showing predefined rules for determining persistence type, according to one embodiment presented in this disclosure.

FIG. 15 is a table 1500 showing predefined rules $116_{1-7}$ for determining persistence type, according to one embodiment presented in this disclosure. Some approaches to determining persistence type may result in incorrect persistence types in certain cases. For example, one approach involves checksum comparisons and deems a difference as being transient if the difference is present during a first comparison and not present during a subsequent comparison. This approach may also deem a difference as being persistent if the difference is present during both comparisons. However, some updates that often arise in active/active configurations may cause rows to be incorrectly deemed persistent. One example of such an update is non-key values of the rows being modified between the two comparisons. By additionally taking the difference type $1502_{1-2}$ of different runs and/or non-key values into account—in addition to the checksums—the persistence type can be more accurately determined at least in some cases. The predefined rules may be tailored to suit the needs of a particular case.

Figure 16:
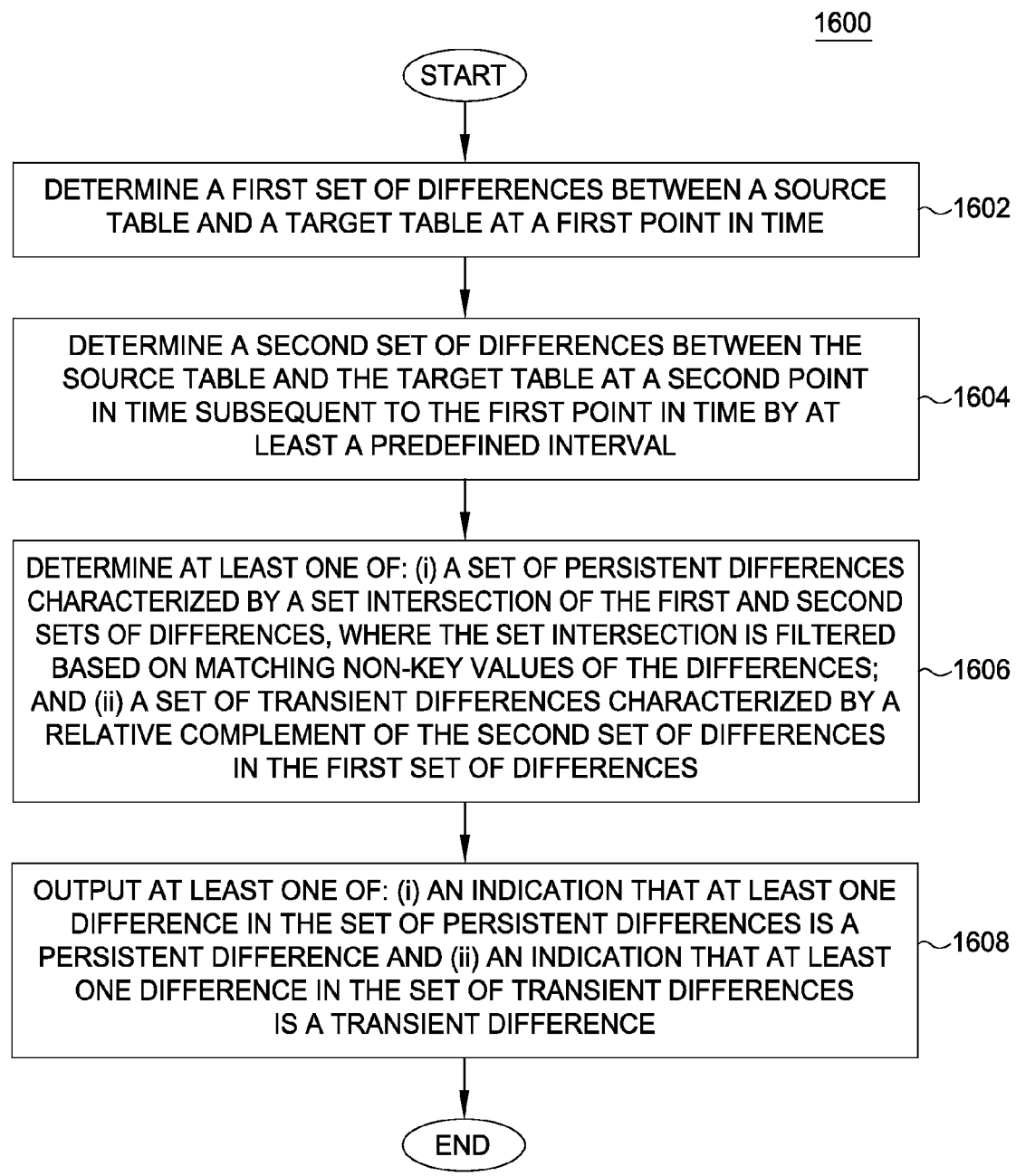
FIG. 16 is a flowchart depicting a method to determine differences between a source table and a target table in a database environment, as being persistent or transient, according to one embodiment presented in this disclosure.

FIG. 16 is a flowchart depicting a method 1600 to determine differences between a source table and a target table in a database environment, as being persistent or transient, and based on sets of differences from different points in time, according to one embodiment presented in this disclosure. As shown, the method 1600 begins at step 1602, where the application 102 determines a first set of differences between the source table and the target table at a first point in time. At step 1604, the application 102 determines a second set of differences between the source table and the target table at a second point in time subsequent to the first point in time. At step 1606, the application 102 determines at least one of: (i) a set of persistent differences characterized by a set intersection of the first and second sets of the differences, where the set intersection is filtered based on matching non-key values of the differences and (ii) a set of transient differences characterized by a relative complement of the second set of differences in the first set of differences. For instance, assuming A and B are sets, the relative complement of A in B, also referred to as the set-theoretic difference of B and A, is the set of elements in B, but not in A. At step 1608, the application 102 outputs at least one of: (i) an indication that at least one difference in the set of persistent differences is a persistent difference and (ii) an indication that at least one difference in the set of transient differences in a transient difference. After the step 1608, the method 1600 terminates.

Accordingly, at least some embodiments presented in this disclosure provide techniques to determine differences between a source table and a target table in a database environment such as a replication environment. By the techniques disclosed herein, differences may be determined more efficiently and/or accurately at least in some cases.

Figure 17:
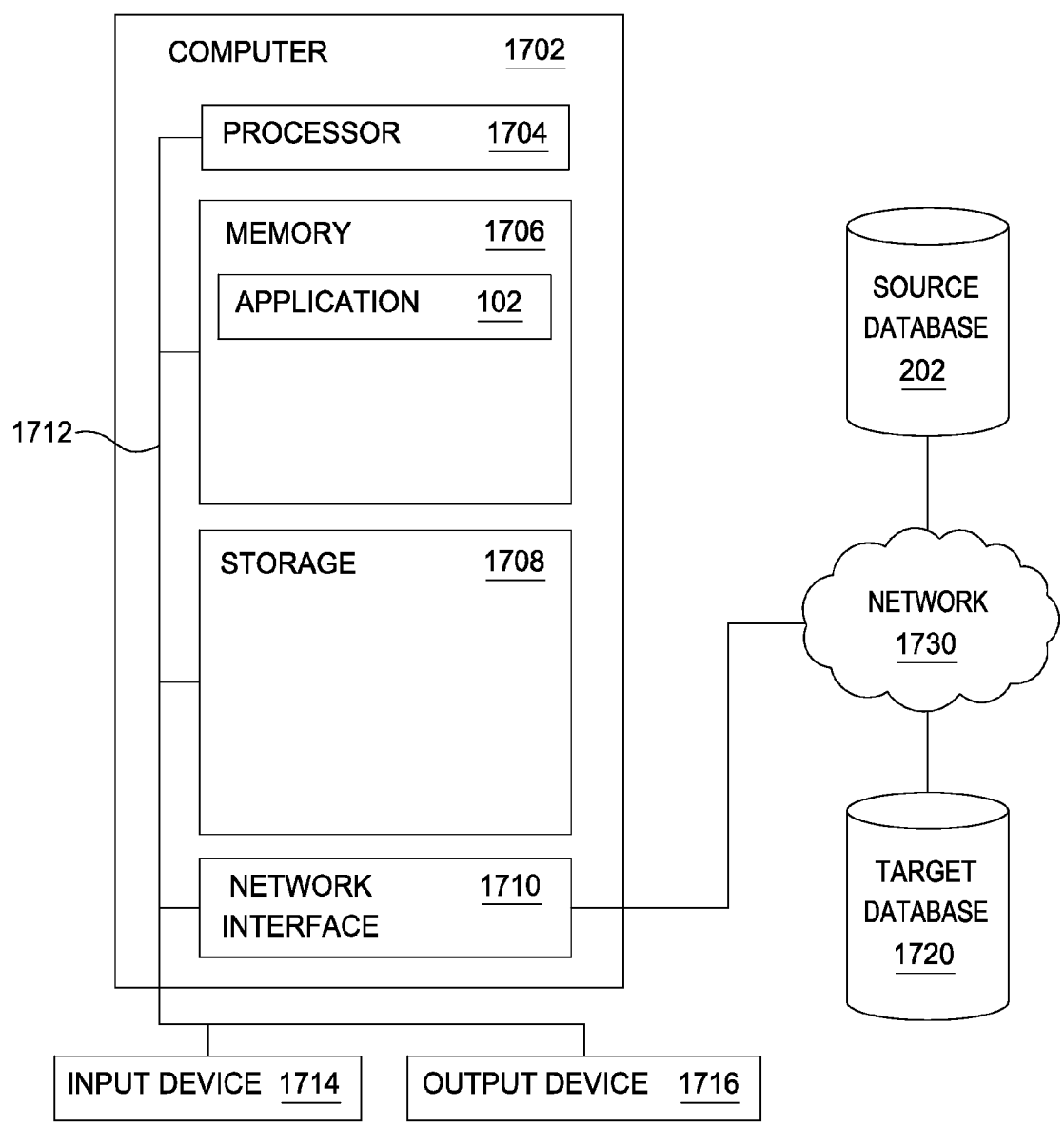
FIG. 17 is a block diagram illustrating components of a networked system configured to determine differences between a source table and a target table, according to one embodiment presented in this disclosure.

FIG. 17 is a block diagram illustrating components of a networked system 1700 configured to determine differences between a source table and a target table, according to one embodiment presented in this disclosure. The networked system 1700 includes a computer 1702, the source database 202, and a target database 1720. The source database 202 stores the source table, while the target database 1720 stores the target table. The computer 1702 may also be connected to other computers via a network 1730. In general, the network 1730 may be a telecommunications network and/or a wide area network (WAN). In a particular embodiment, the network 1730 is the Internet.

The computer 1702 generally includes a processor 1704 connected via a bus 1712 to a memory 1706, a network interface device 1710, a storage 1708, an input device 1714, and an output device 1716. The computer 1702 is generally under the control of an operating system. Examples of operating systems include UNIX, versions of the Microsoft Windows® operating system, and distributions of the Linux® operating system. More generally, any operating system supporting the functions disclosed herein may be used. The processor 1704 is included to be representative of a single CPU, multiple CPUs, a single CPU having multiple processing cores, and the like. Similarly, the memory 1706 may be a random access memory. While the memory 1706 is shown as a single identity, it should be understood that the memory 1706 may comprise a plurality of modules, and that the memory 1706 may exist at multiple levels, from high speed registers and caches to lower speed but larger DRAM chips. The network interface device 1710 may be any type of network communications device allowing the computer 1702 to communicate with other computers via the network 1730.

The storage 1708 may be a persistent storage device. Although the storage 1708 is shown as a single unit, the storage 1708 may be a combination of fixed and/or removable storage devices, such as fixed disc drives, solid state drives, floppy disc drives, tape drives, removable memory cards or optical storage. The memory 1706 and the storage 1708 may be part of one virtual address space spanning multiple primary and secondary storage devices.

The input device 1714 may be any device for providing input to the computer 1702. For example, a keyboard and/or a mouse may be used. The output device 1716 may be any device for providing output to a user of the computer 1702. For example, the output device 1716 may be any conventional display screen or set of speakers. Although shown separately from the input device 1714, the output device 1716 and input device 1714 may be combined. For example, a display screen with an integrated touch-screen may be used.

As shown, the memory 1706 of the computer 1702 includes the application 102. By configuring the application 102 according to the techniques disclosed herein, differences between the source and target tables may be determined more efficiently and/or accurately at least in some cases.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, the application may execute in the cloud, and the source and target tables may also be stored in the cloud. The application may determine differences between the source and target tables according to the techniques disclosed herein. Thus, the user may access the application and the determined persistent or transient differences, from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer program product to programmatically determine differences between a source table and a target table in a database environment, as being persistent or transient, and based on sets of differences from different points in time, the computer program product comprising:
a non-transitory computer-readable storage medium having program code embodied therewith, the program code executable by one or more computer processors to:
determine a first set of differences between the source table and the target table at a first point in time, wherein the database environment comprises an active-active replication environment, wherein the first set of differences is generated via a first comparison operation comparing a set of rows between the source and target tables;
determine a second set of differences between the source table and the target table at a second point in time subsequent to the first point in time by at least a predefined interval, wherein the second set of differences is generated via a second comparison operation restricted to comparing a subset of rows between the source and target tables, to which the first set of differences pertains, and wherein the first and second comparison operations are based at least in part on a composite checksum aggregating two row-based checksums from the source table and the target table, respectively;
determine, by operation of one or more computer processors when executing the program code, without suspending application access to the source and target tables, and without any changing any schema of the source and target tables: (i) a set of persistent differences comprising a set intersection of the first and second sets of differences, wherein the set intersection is filtered based on matching non-key values of differences in the set intersection; and (ii) a set of transient differences comprising a relative complement of the second set of differences in the first set of differences;
outputting an indication of each difference in the set of persistent differences as being persistent; and
outputting an indication of each difference in the set of transient differences as being transient.

2. The computer program product of claim 1, wherein the predefined interval comprises a replication latency interval, wherein each of the set of persistent differences and the set of transient differences is determined based further on difference types of the first and second sets of differences, wherein the difference types are determined based on comparing non-key values of the first and second sets of differences, wherein the subset of rows is smaller than the set of rows.

3. The computer program product of claim 2, wherein at least one given set selected from set of persistent differences and the set of transient differences is determined based on checksums generated for rows to which the given set of differences pertains, wherein the program code is further executable to:
determine a set of tentative differences by filtering the second set of differences based on non-matching non-key values of the differences, wherein at least one difference in the set of tentative differences is subsequently determined to be a persistent difference or a transient difference.

4. The computer program product of claim 3, wherein the second comparison operation is further restricted based on a specified block range, wherein the at least one difference is determined to be a persistent difference or a transient difference based on the second set of differences and a third set of differences, wherein the third set of differences is determined between the source table and the target table at a third point in time subsequent to the second point in time by at least the predefined interval.

5. The computer program product of claim 4, wherein the second comparison operation includes reuse of one or more partitioning queries generated in the first comparison operation, wherein the transient differences comprise false-positive differences resulting from an asynchronous property of the replication environment.

6. The computer program product of claim 5, wherein each of the first comparison operation and the second comparison operation is performed via coordination among a pool of threads including a plurality of merger threads and a difference reporter thread, wherein the false-positive differences comprise changes at the source table that have yet to be propagated to the target table, due to the asynchronous property of the replication environment.

7. The computer program product of claim 6, wherein the second comparison operation includes one or more multi-row insert operations, whereby multiple difference determinations between the source and target tables are used to distinguish between persistent differences and transient differences of the source and target tables;
wherein the pool of threads further includes a main thread, a partitioner thread, and a plurality of worker threads.

8. A system to programmatically determine differences between a source table and a target table in a database environment, as being persistent or transient, and based on sets of differences from different points in time, the system comprising:
one or more computer processors;
a memory containing a program which, when executed by the one or more computer processors, is configured to perform an operation comprising:
determining a first set of differences between the source table and the target table at a first point in time, wherein the database environment comprises an active-active replication environment, wherein the first set of differences is generated via a first comparison operation comparing a set of rows between the source and target tables;
determining a second set of differences between the source table and the target table at a second point in time subsequent to the first point in time by at least a predefined interval, wherein the second set of differences is generated via a second comparison operation restricted to comparing a subset of rows between the source and target tables, to which the first set of differences pertains, and wherein the first and second comparison operations are based at least in part on a composite checksum aggregating two row-based checksums from the source table and the target table, respectively;
determining without suspending application access to the source and target tables, and without any changing any schema of the source and target tables: (i) a set of persistent differences comprising a set intersection of the first and second sets of differences, wherein the set intersection is filtered based on matching non-key values of differences in the set intersection; and (ii) a set of transient differences comprising a relative complement of the second set of differences in the first set of differences;

outputting an indication of each difference in the set of persistent differences as being persistent; and outputting an indication of each difference in the set of transient differences as being transient.

9. The system of claim 8, wherein the predefined interval comprises a replication latency interval, wherein each of the set of persistent differences and the set of transient differences is determined based further on difference types of the first and second sets of differences, wherein the difference types are determined based on comparing non-key values of the first and second sets of differences, wherein the subset of rows is smaller than the set of rows.

10. The system of claim 9, wherein at least one given set selected from set of persistent differences and the set of transient differences is determined based on checksums generated for rows to which the given set of differences pertains, wherein the operation further comprises:

determining a set of tentative differences by filtering the second set of differences based on non-matching non-key values of the differences, wherein at least one difference in the set of tentative differences is subsequently determined to be a persistent difference or a transient difference.

11. The system of claim 10, wherein the second comparison operation is further restricted based on a specified block range, wherein the at least one difference is determined to be a persistent difference or a transient difference based on the second set of differences and a third set of differences, wherein the third set of differences is determined between the source table and the target table at a third point in time subsequent to the second point in time by at least the predefined interval.

12. The system of claim 11, wherein the second comparison operation includes reuse of one or more partitioning queries generated in the first comparison operation, wherein the transient differences comprise false-positive differences resulting from an asynchronous property of the replication environment;

wherein each of the first comparison operation and the second comparison operation is performed via coordination among a pool of threads including a plurality of merger threads and a difference reporter thread, wherein the false-positive differences comprise changes at the source table that have yet to be propagated to the target table, due to the asynchronous property of the replication environment.

13. The system of claim 12, wherein the second comparison operation includes one or more multi-row insert operations, whereby multiple difference determinations between the source and target tables are used to distinguish between persistent differences and transient differences of the source and target tables;

wherein the pool of threads further includes a main thread, a partitioner thread, and a plurality of worker threads.

* * * * *